United States Patent [19]

Brown et al.

[11] Patent Number: 4,604,733

[45] Date of Patent: Aug. 5, 1986

[54] APPARATUS FOR DETERMINING RANGE AND BEARING

[75] Inventors: Billy F. Brown, Arnold; Kenneth J. Petrosky, Glen Burnie, both of Md.

[73] Assignee: Westinghouse Electric Corp., Pittsburgh, Pa.

[21] Appl. No.: 567,592

[22] Filed: Jan. 3, 1984

[51] Int. Cl.[4] .................... G01S 15/42; G01S 15/74
[52] U.S. Cl. ............................ 367/2; 343/6.5 R; 367/134
[58] Field of Search ............. 367/2, 125, 134; 343/6.8 R, 6.8 LC, 6.5 R, 6.5 LC

[56] References Cited

U.S. PATENT DOCUMENTS

| | | | |
|---|---|---|---|
| 1,750,668 | 3/1930 | Green | 343/9 R |
| 3,461,421 | 8/1969 | Stover | 367/3 X |
| 3,588,795 | 6/1971 | Linardos et al. | 367/108 |
| 3,721,950 | 3/1973 | Jorgensen et al. | 367/2 |
| 3,745,518 | 7/1973 | Barret et al. | 367/6 |
| 4,000,466 | 12/1976 | Scouten et al. | 367/125 X |
| 4,055,830 | 10/1977 | Wilson et al. | 367/2 X |
| 4,176,338 | 11/1979 | Spindle et al. | 367/6 |
| 4,313,183 | 1/1982 | Saylors | 367/2 X |

Primary Examiner—Richard A. Farley
Attorney, Agent, or Firm—D. Schron

[57] ABSTRACT

Apparatus which provides both range and bearing information between a transponder and a transponder interrogator. The interrogator transmits an acoustic interrogating pulse which is received by the transponder and in response thereto transmits back a first signal of a certain frequency f1. Two spaced apart hydrophones on the transponder provide their respective output signals to a phase meter, the output signal of which is indicative of the direction, that is, bearing, from which the interrogating pulse impinged. The phase meter output is converted to a corresponding time delay after which a second signal of a frequency f2 is transmitted. A counter in the interrogator starts counting upon transmission of the interrogating pulse and stops upon reception of the first signal of frequency f1. A second counter of the interrogator starts its count when the first counter turns off and terminates its count when the second signal f2 is received. The count in the first counter is converted to a corresponding range display and the count in the second counter is converted to a corresponding bearing display.

13 Claims, 2 Drawing Figures

APPARATUS FOR DETERMINING RANGE AND BEARING

GOVERNMENT CONTRACT CLAUSE

The government has rights in this invention pursuant to Contract No. N00140-80-G-9970-J.O.0005 awarded by the Department of the Navy.

BACKGROUND OF THE INVENTION

1. Field of the Invention

The invention in general relates to navigation systems, and more particularly to an underwater system for determining range and bearing between two points.

2. Description of the Prior Art

A transponder basically is a device which, upon receipt of an interrogating signal, will transmit its own identifiable signal. Acoustic transponders may be utilized in the underwater environment for navigation purposes. For example, a transponder interrogator, or interrogator, at a certain location can transmit an acoustic interrogating pulse signal to the transponder at a distant location. In one common type of interrogator apparatus a counter is started at the time of transmission. The distant transponder receives the interrogating signal and in response thereto transmits its own identifiable signal which is received by the interrogator and utilized to turn off the running counter. With a known speed of sound in the water, the count will provide an indication of the distance between interrogator and transponder.

The interrogator may be carried by a surface or subsurface vessel with the transponder position at known coordinates on a map. The arrangement however only provides range information and not bearing information. Bearing information may be obtained to compute a precise location by providing a plurality of transponders at known locations each operable to provide an individually identifiable signal distinct from the other transponders and each triggerable upon receipt of the same interrogating signal from the interrogator. Knowing the range to each transponder and their precise relative positions, the precise position of the interrogator may be determined.

Another method of obtaining bearing information without the requirement for using a plurality of transponders is to provide an interrogator which rotates and is indexed through 360° and transmits an interrogating signal with an extremely narrow beam pattern during rotation. Such apparatus generally is bulky, consumes power, and requires rotating seals.

The apparatus of the present invention functions to determine range and bearing utilizing only a single transponder and without the requirement for rotation of the interrogating portion of the system. The apparatus is lightweight, compact and the interrogator portion can be carried not only by surface and subsurface vessels but can also be utilized by free swimmers or small sports submersibles for homing in on a specific location such as a base station.

SUMMARY OF THE INVENTION

The range and bearing apparatus includes first means operational at a first location for transmitting an acoustic interrogating signal. Second means operational at a second location is responsive to the interrogating signal to retransmit an acoustic first response signal upon receipt of the interrogating signal and to transmit an acoustic second response signal at a certain time after transmission of the first response signal and which time is a function of the bearing between the first and second locations.

The second means includes two hydrophones spaced at a distance of approximately $\lambda/2$, where $\lambda$ is the wavelength of the interrogating signal, the outputs of these two hydrophones being connected to a phase meter for deriving a phase difference between their outputs. The phase difference is an indication of the direction of impingement of the interrogating signal and this value is utilized to generate a proportional time delay for generation of the second response signal.

The first means is responsive to receipt of the first and second response signals and is operable to generate range and bearing information.

DESCRIPTION OF THE PREFERRED EMBODIMENT

Figure 1:
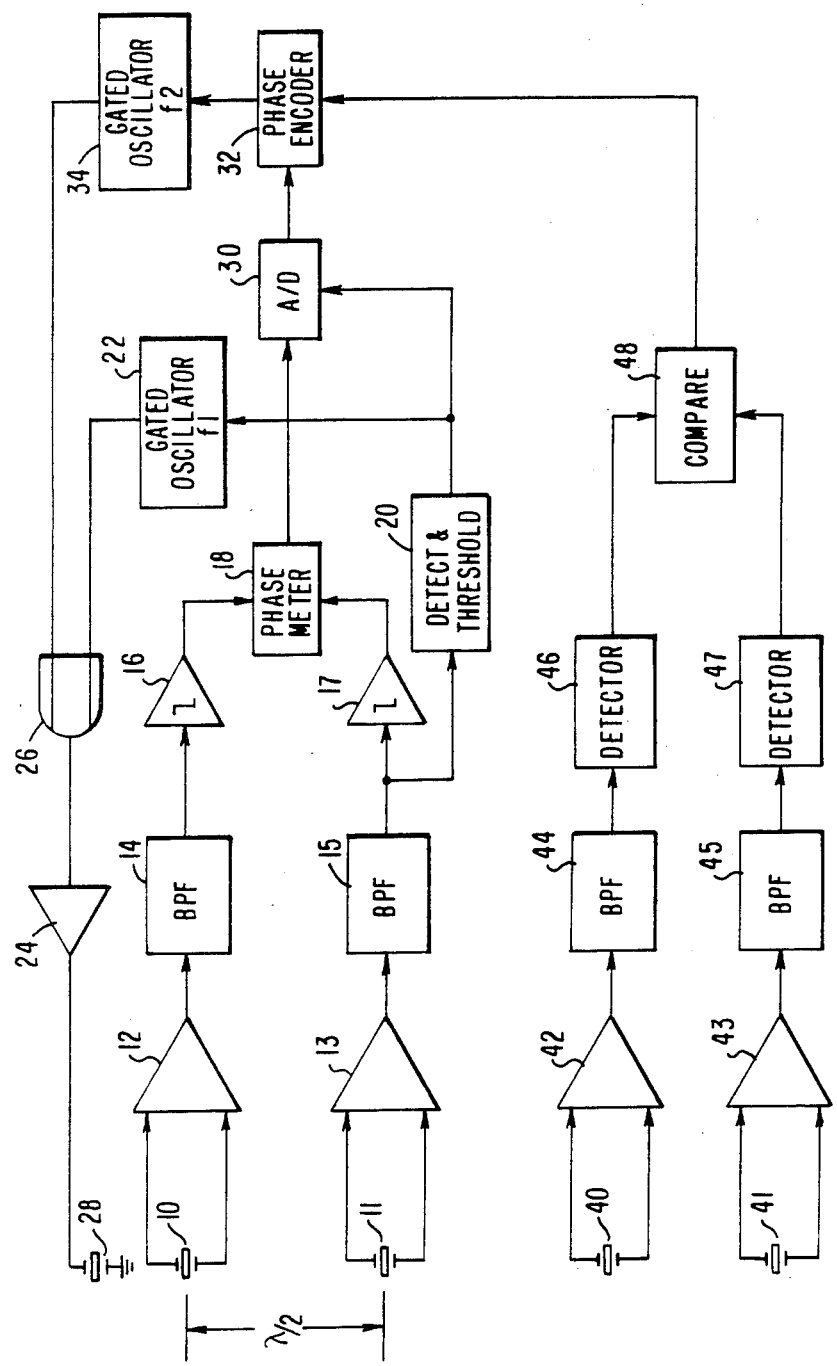
FIG. 1 is a block diagram of the transponder portion of the apparatus.

Referring now to FIG. 1, the apparatus includes two omnidirectional hydrophones 10 and 11 spaced apart by a distance of $\lambda/2$, where $\lambda$ is the wavelength of an interrogating signal. It is well known that if an acoustic signal impinges upon the hydrophones from a direction perpendicular to a line joining the hydrophones, then they will each produce identical signals in phase with respect to one another. For any direction other than perpendicular, an impinging signal will cause the hydrophones to provide outputs which are out of phase with respect to one another with the phase difference being indicative of the direction of the incoming signal. Accordingly, means are provided to determine such phase difference so as to obtain an indication of the bearing of the transponder relative to the source of the interrogating signal.

In order to obtain this phase difference indication, the outputs of the hydrophones 10 and 11 are amplified in respective amplifiers 12 and 13 and in order to optimize the pulse to noise ratio, respective bandpass filters 14 and 15 are provided for eliminating out of band noise. Clippers 16 and 17 function to limit the amplitude of the signals from the bandpass filter so as to provide phase meter 18 with squarewave signal inputs for comparison purposes.

In response to receipt of the interrogating signal, the transponder is operable to retransmit a first response signal. In order to prevent false triggering in response to low level ambient noise, the apparatus is provided with a detect and threshold circuit 20 which serves to trigger gated oscillator 22 only when the received signal is above a cetain predetermined threshold.

The gated oscillator signal, of frequency f1, is provided to amplifier 24 through OR gate 26 and is transmitted as an acoustic pulse by means of omnidirectional projector 28.

The output of phase meter 18, indicative of bearing, is provided to analog-to-digital (A/D) converter 30 which samples the phase meter output and converts it to digital form in response to any output from the detect and threshold circuit 20. The digital information is provided to a phase encoder 32 which is operable to trigger a gated osciallator 34 after a time period governed by the value supplied to it from the A/D converter 30. By way of example, the phase encoder 32 may simply include a counter which is set to a certain digital value in accordance with the digital signal supplied to it and thereafter operable to count down to zero and provide an output triggering pulse when the zero count is attained. Gated oscillator 34 then provides the second response signal transmitted by omnidirectional projector 28. In order to be operable in locations which may cause multipath transmissions, gated osciallator 34 preferably generates a signal of frequency f2 so as to be uniquely identifiable with respect to the first response signal of frequency f1.

If the apparatus is to be used in operational conditions under which the relative bearing is known to fall within predetermined limits less than 180°, then the apparatus thus far described will provide both range and bearing information. If however a full 360° of bearing is to be resolved, then means may be provided for resolving directional ambiguity.

In order to accomplish this resolution of ambiguity, the transponder apparatus of FIG. 1 includes two hydrophones 40 and 41 each of which has a certain directional beam pattern, as opposed to hydrophones 10 and 11 which are omnidirectional. For example, directional hydrophone 40 may be oriented to respond to signals from a forward hemisphere while directional hydrophone 41 may be oriented to respond to signals from an aft hemisphere. The outputs of hydrophones 40 and 41 are amplified by respective amplifiers 42 and 43 and provided to bandpass filters 44 and 45 for removing out of band noise. The resulting signals are detected by means of detectors 46 and 47 the output signals of which are provided to comparison circuit 48. In operation, if the interrogating signal as received by all of the hydrophones impinges from the forward hemisphere then detector 46 will provide the higher output signal to comparison circuit 48. Conversely if the signal is received from the aft hemisphere then detector 47 will provide the higher output signal. Comparison circuit 48 then is operable to provide a certain value to phase encoder 32 if detector 46 has the higher output and to provide a different value if detector 47 has the higher output. By way of example the two respective values may be basically a digital zero or digital one which is combined with the digital signal from the A/D converter 30 to either not modify, or increase the count which must be counted down, as the case may be. Thus if the signal is from the aft hemisphere, 180° to 360°, it will take longer for the phase encoder counter to count down to zero due to the increased count provided by comparison circuit 48 and thus the second response signal provided by gated oscillator 34 will be provided at a proportionally longer time after provision of the first response signal.

Figure 2:
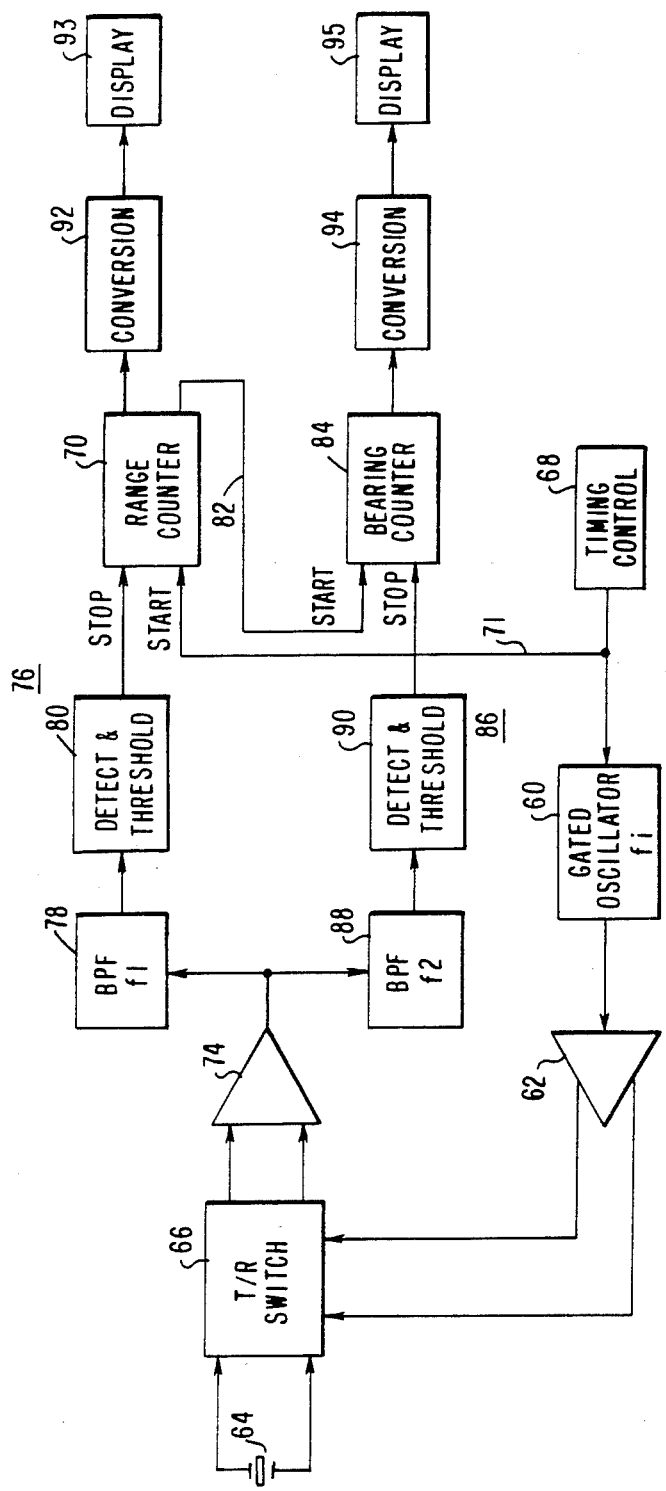
FIG. 2 is a block diagram of the interrogator portion of the apparatus.

The interrogator portion of the apparatus is illustrated in FIG. 2. Gated oscillator 60 is operable to provide an interrogation signal of frequency $f_i$ which, after amplification by amplifier 62, is provided to transducer 64 via the transmit receive (T/R) switch 66. Although two transducers can be provided, transducer 64 operates as both a projector of the acoustic interrogating signal and as the receptor or hydrophone for the first and second response signals.

The gated oscillator 60 is triggered in response to an output from the timing control circuit 68 which, upon triggering gated oscillator 60, also starts a first, or range counter 70 via a signal on line 71.

When the first response signal provided by the transponder of FIG. 1 is received by transducer 64, it is passed to amplifier 74 via T/R switch 66. The signal will be passed through the upper or range signal processing channel 76 since filter 78 is designed to accept only the first response signal of frequency f1. The filtered signal is detected in circuit 80 which will provide an output signal to stop the range counter 70 if the detected signal is above a certain predetermined threshold. When range counter 70 stops it will provide an output signal on line 82 to cause a second, or bearing counter 84 to commence its counting function.

When the second response signal is received, it will be passed through the lower or bearing signal processing channel 86 by filter 88 designed to pass signals of frequency f2. The detection and thresholding of the filtered signal will cause an output signal from circuit 90 to stop the bearing counter. Bearing counter 84 operates in essence as a Δt counter where Δt is equivalent to the time difference between transmissions of the first and second response signals such time difference being indicative of the relative bearing.

The count in range counter 70 is converted to a corresponding range signal for display purposes by means of conversion circuitry 92 and thereafter provided to a display 93 which is operable to provide a numerical readout of range. Similarly, the count in the bearing counter 84 is converted, by conversion circuitry 94 into a suitable signal for displaying bearing information on display 95. Conversion circuits 92 and 94 may simply be lookup tables operating in a well known manner to convert a particular count to a corresponding particular voltage and may be incorporated in the display device itself.

We claim:

1. Apparatus for determination of range and bearing, comprising:
   (a) first means, for operation at a first location, for transmitting an acoustic interrogating signal;
   (b) second means, for operation at a second location, responsive to said interrogating signal to, in turn,
      (i) transmit a first response signal upon receipt of said interrogating signal, and
      (ii) transmit a second response signal at a time after transmission of said first response signal, where said time is a function of the bearing between said first and second locations;
   (c)
      (i) said first means including means for generating range and bearing information in response to receipt of said first and second response signals;
   (d) said second means including
      (i) first and second hydrophones spaced apart by a distance of approximately λ/2, where λ is the wavelength of said interrogating signal, and each operable to provide an output signal in response to impingement of said interrogating signal;
      (ii) a phase meter responsive to said hydrophone output signals and operable to provide an output signal indicative of the phase difference between them, said phase difference being related to the direction of impingement of said interrogating signal;
      (iii) means for translating said phase meter output signal to a corresponding time delay;

(iv) means for generating said first response signal in response to said impingement of said interrogating signal; and (v) means for generating said second response signal after said time delay.

2. Apparatus according to claim 1 wherein said means for translating includes:

(a) an A/D converter coupled to said phase meter for providing a digital representation of its output signal;

(b) a phase encoder for receiving said digital representation and for providing an output signal after a time governed by the value of said digital representation;

(c) said means for generating said second response signal being triggered by said output signal of said phase encoder.

3. Apparatus according to claim 2 wherein said phase encoder includes:

(a) counter means operable to count down to zero from particular digital settings entered into said counter means;

(b) said particular digital settings being input from said A/D converter;

(c) said phase encoder providing its output signal upon attainment of said zero count.

4. Apparatus according to claim 1 wherein said second means additionally includes:

(a) means for resolving any 180° ambiguities in the direction of impingement of said interrogating signal.

5. Apparatus according to claim 4 wherein said means for resolving includes:

(a) a first directional hydrophone having a beam pattern for generating a maximum response in response to impingement of acoustic energy from a first direction;

(b) a second directional hydrophone having a beam pattern for generating a maximum response in response to impingement of acoustic energy from an opposite direction;

(c) means for comparing the output signals of said directional hydrophones and providing two distinct outputs depending upon which signal is greater; and (d) means for modifying said time delay in response to one of said distinct output signals.

6. Apparatus according to claim 3 which includes:

(a) a first directional hydrophone having a beam pattern for generating a maximum response in response to impingement of acoustic energy from a first direction;

(b) a second directional hydrophone having a beam pattern for generating a maximum response in response to impingement of acoustic energy from an opposite direction;

(c) means for comparing the output signals of said directional hydrophones and providing a digital zero output if the output signal of the first is greater than the output signal of the second, and providing a digital one output if the output signal of the second is greater;

(d) said digital one output signal being provided to said phase encoder to increase the initial count of said counter means.

7. Apparatus according to claim 1 wherein said second means includes:

(a) threshold means for triggering said means for generating said first response signal only if the output signal of at least one of said hydrophones is above a predetermined threshold value.

8. Apparatus according to claim 1 wherein:

(a) said first response signal is of frequency f1; and (b) said second response signal is of frequency f2.

9. Apparatus according to claim 1 wherein said means for generating includes:

(a) first and second counters;

(b) means for starting said first counter upon transmission of said interrogating signal;

(c) means for stopping said first counter and starting said second counter in response to receipt of said first response signal; and (d) means for stopping said second counter in response to receipt of said second response signal.

10. Apparatus according to claim 9 which additionally includes:

(a) means for converting the count in said first counter, when stopped, to a first display signal;

(b) means for converting the count in said second counter, when stopped, to a second display signal; and (c) means for displaying said first and second display signals as respective range and bearing indications.

11. Apparatus according to claim 9 wherein:

(a) said first counter is disposed in a first signal processing channel;

(b) said second counter is disposed in a second signal processing channel;

(c) said first signal processing channel including means for processing only said first response signals;

(d) said second signal processing channel including means for processing only said second response signals.

12. Apparatus according to claim 11 wherein:

(a) said first response signal is of frequency f1; and (b) said second response signal is of frequency f2.

13. Apparatus according to claim 12 wherein said first means includes:

(a) a single transducer for projecting said interrogating signal and for receiving said first and second response signals.

* * * * *